US007292507B2

(12) United States Patent
Han

(10) Patent No.: US 7,292,507 B2
(45) Date of Patent: Nov. 6, 2007

(54) PLAY CONTROL METHOD IN DIGITAL VERSATILE DISC PLAYER

(75) Inventor: Gyoo Min Han, Incheon-si (KR)

(73) Assignee: LG Electronics Inc., Seoul (KR)

( * ) Notice: Subject to any disclaimer, the term of this patent is extended or adjusted under 35 U.S.C. 154(b) by 784 days.

(21) Appl. No.: 10/660,782

(22) Filed: Sep. 12, 2003

(65) Prior Publication Data
US 2004/0120228 A1   Jun. 24, 2004

(30) Foreign Application Priority Data
Sep. 13, 2002 (KR) ...................... 10-2002-0055624

(51) Int. Cl.
*G11B 7/085* (2006.01)
(52) U.S. Cl. ..................... 369/30.25; 386/95; 386/97
(58) Field of Classification Search ............ 369/30.25, 369/30.36, 30.3; 386/45, 39, 97
See application file for complete search history.

(56) References Cited

U.S. PATENT DOCUMENTS 6,028,979 A * 2/2000 Hirayama et al. ............ 386/95
6,128,434 A * 10/2000 Hirayama et al. ............ 386/97
6,771,888 B1 * 8/2004 Cookson et al. .............. 386/95
6,798,981 B1 * 9/2004 Yamauchi et al. ........... 386/126
6,965,727 B1 * 11/2005 Sawabe et al. ............... 386/96
2001/0040842 A1 * 11/2001 Yokota et al. ................. 369/32
2003/0039472 A1 * 2/2003 Kim ........................... 386/126
2003/0086681 A1 * 5/2003 Miyagawa ..................... 386/34

* cited by examiner

*Primary Examiner*—Wayne Young
*Assistant Examiner*—Abdukader Muhammed
(74) *Attorney, Agent, or Firm*—Ked & Associates, LLP

(57) ABSTRACT

An optical disc player such as a digital versatile disc (DVD) player and a play control method thereof can include setting a reproduction mode for a disc loaded in the digital versatile disc player, storing the set reproduction mode, and reading out and reproducing information recorded on the disc and subsequent discs in accordance with the stored reproduction mode. In accordance with this method, it is possible to carry out play operations of optical discs of different types in the DVD player in accordance with the set and stored reproduction modes. The reproduction modes can include subtitle languages, audio languages, audio formats and the like recorded on each optical disc. According to preferred embodiments it is unnecessary to set desired reproduction modes for each optical disc subsequently used in the DVD player.

18 Claims, 4 Drawing Sheets

FIG. 3

User Menu

| Setting Menu | Code |
|---|---|
| Subtitle | 0001(KOR.) |
| Audio Language | 1002(ENG.) |
| Audio Format | 2002(6CH) |

Subtitle Menu

| Subtitle | Code | Default |
|---|---|---|
| KOR | 0001 | ← |
| ENG | 0002 | |
| SPA | 0003 | |
| FRA | 0004 | |
| . | . | |
| . | . | |

Audio Language Menu

| Audio Language | Code | Default |
|---|---|---|
| KOR | 1001 | ← |
| ENG | 1002 | |
| SPA | 1003 | |
| FRA | 1004 | |
| . | . | |
| . | . | |

Audio Format Menu

| Audio Format | Code | Default |
|---|---|---|
| 2CH | 2001 | ← |
| 6CH | 2002 | |
| DTS | 2003 | |
| . | . | |
| . | . | |

PLAY CONTROL METHOD IN DIGITAL VERSATILE DISC PLAYER

BACKGROUND OF THE INVENTION

1. Field of the Invention

The present invention relates to an optical disc player and method, and more particularly, to a play control method in a digital versatile disc (DVD) player.

2. Background of the Related Art

Generally, DVD players are adapted to play an optical disc such as a DVD or HD-DVD by reproducing data recorded on the optical disc. Such optical discs include at least one subtitle language or audio language in accordance with the disc type, so that data of a user selected language can be reproduced. Such discs may also have various audio recording formats so that the user can select a desired audio play mode meeting the specification of the disc player.

Related art DVD players play an optical disc in a default reproduction mode automatically set based on the recording information fixed in the manufacture of the optical disc in association with subtitle languages, audio languages, and audio formats recorded on the optical disc. For this reason, the user must search for recording information about a desired reproduction mode in order to change the reproduction mode from the default mode when playing an optical in other than default reproduction mode. However, such operations are inefficient, time-consuming and inconvenient and based only on information on the optical disc. Thus, there is a long felt need for handling a default reproduction mode in an optical disc player.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the present invention is to provide an optical disc player and method thereof that can set a prescribed reproduction mode for use.

Another object of the present invention is to provide an optical disc player and play control method that can allow a user to set a desired reproduction mode, and control the optical disc player to play an optical disc in accordance with the set reproduction mode.

At least the above objects can be accomplished in a whole or in part in accordance with the present invention by providing a play control method in a digital versatile disc player that includes (A) setting a reproduction mode of a user menu for a disc loaded in the digital versatile disc player, (B) storing the set reproduction mode and (C) reading out and reproducing information recorded on the disc in accordance with the stored reproduction mode.

At least the above objects can be accomplished in a whole or in part in accordance with the present invention by providing a play control method in a DVD player that includes setting a prescribed reproduction mode in the DVD player, and playing information recorded on a plurality of subsequently loaded discs in accordance with the stored reproduction mode.

At least the above objects can be accomplished in a whole or in part in accordance with the present invention by providing a play control method in an optical disc player that includes setting a reproduction mode of a user menu in the optical disc player, and retrievably storing the set reproduction mode in the optical disc player for use with two or more loaded discs.

At least the above objects can be accomplished in a whole or in part in accordance with the present invention by providing an optical disc player that includes units for setting a reproduction mode of a user menu in the optical disc player, and units for retrievably storing the set reproduction mode in the optical disc player for use with two or more loaded discs.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 3 is a diagram illustrating an exemplary user menu including reproduction modes set by the user in accordance with the present invention, and exemplary recording information recorded on an optical disc.

DETAILED DESCRIPTION OF PREFERRED EMBODIMENTS

Figure 1:
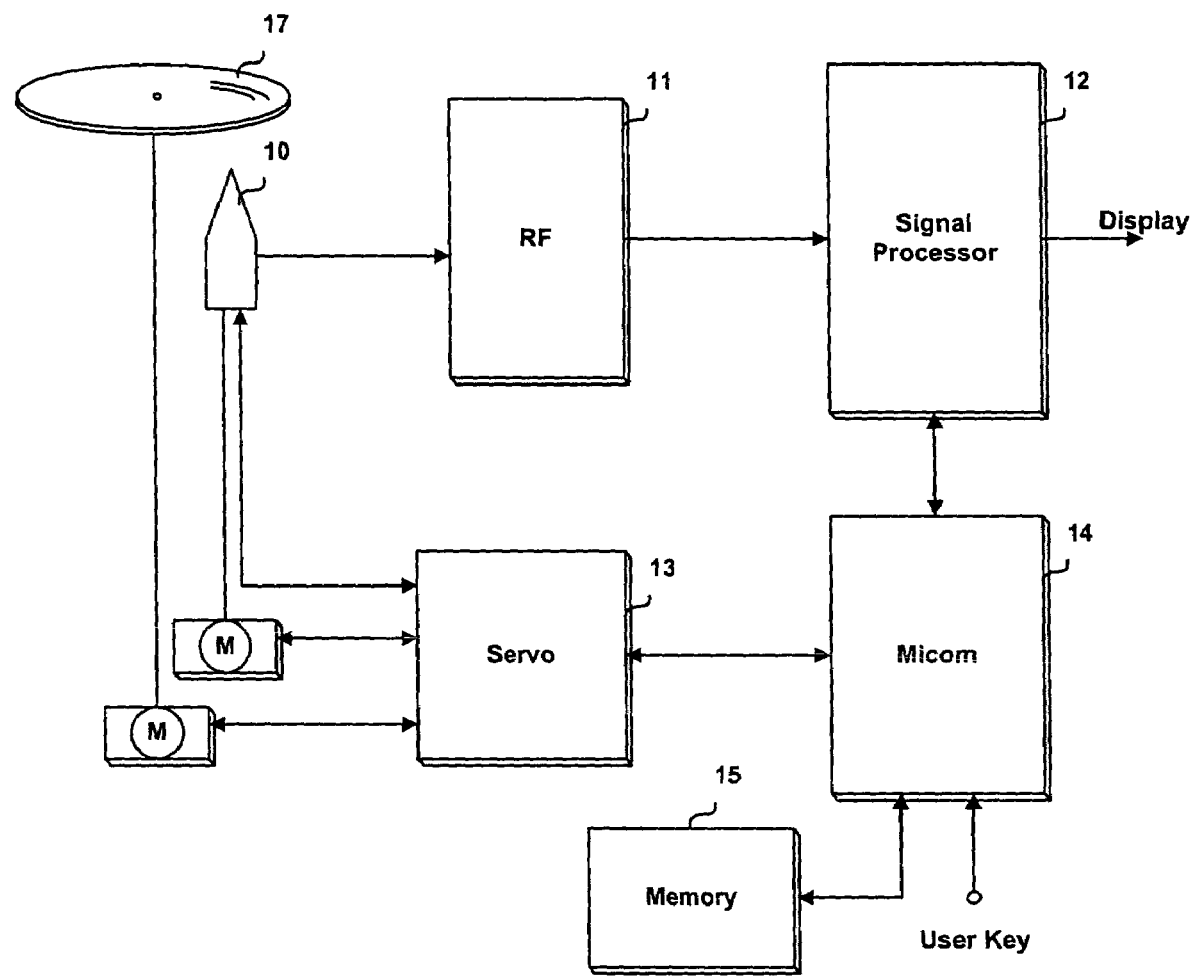
FIG. 1 is a block diagram illustrating the configuration of a DVD player to which play control methods according to preferred embodiments of the present invention can be applied.

Related art DVD players play an optical disc in a default reproduction mode automatically set based on the recording information fixed in the manufacture of the optical disc in association with subtitle languages, audio languages, and audio formats recorded on the optical disc. That is, the highest-order one of multiple reproduction modes recorded on an optical disc is selected and set as a default reproduction mode. Accordingly, the default reproduction mode of a DVD player may vary depending on the loaded optical disc. Even when an optical disc is re-loaded after being ejected, the DVD player performs a play operation in the same default reproduction mode. For this reason, where it is desired to play an optical disc in a reproduction mode other than a default reproduction mode, the user should search for recording information about a desired reproduction mode in order to change the reproduction mode from the default mode to the searched desired reproduction mode. However, such operations are time-consuming and inconvenient. Further, as described above, although the desired reproduction mode is set for a particular optical disc, it is necessary to again set the reproduction mode when the optical disc is re-loaded.

As described above, different optical discs have different default reproduction modes, respectively. For example, where there are a first disc having subtitles of multiple languages recorded in the order of English/Korean/French languages, a second disc having subtitles of multiple languages recorded in the order of Korean/French/English languages, a third disc having subtitles of multiple languages recorded in the order of French/Korean/English languages, and a fourth disc having subtitles of multiple languages recorded in the order of French/English/Korean languages, respective default reproduction modes of those discs are different because each default reproduction mode is set to a highest-order reproduction mode of the associated disc.

Accordingly, the subtitle of the first disc is reproduced in English, and the subtitle of the second disc is reproduced in Korean. Further, the respective subtitle of the third and fourth discs is reproduced in French, even though the respective disc architectures and orders are different. The same default reproduction mode method used to set the subtitle language is applied to audio languages and audio formats.

Such related art operations will now be described in more detail in conjunction with the above example including the first through fourth discs. Since optical disc players automatically determine a default reproduction language, which is to be reproduced from an optical disc, based only on the order of recorded languages on the optical disc, the default reproduction language is English in the case of the first disc, Korean in the case of the second disc, and French in the case of the third or fourth disc. That is, when the second disc is played, following a play operation of the first disc, the default reproduction language is changed from English to Korean. For this reason, when the user desires to reproduce the same subtitle language for several optical discs, there is inconvenience in that it is necessary to retrieve the subtitle languages recorded on each disc when the disc is loaded, and to set the reproduction mode of the disc to a desired subtitle language selected from the retrieved subtitle languages.

Further, when an optical disc is ejected after being played, the subtitle language value set by the user is erased. Accordingly, when the optical disc is re-loaded, the subtitle language to be reproduced for the disc is automatically set to a default subtitle language. For example, although the subtitle language to be reproduced for the first disc is set in use to Korean, the first disc will be played in a default language (i.e., English) in a re-loaded state.

FIG. 1 illustrates the configuration of a DVD player to which a play control method according to preferred embodiments of the present invention can be applied. As shown in FIG. 1, a DVD player can include an optical pickup 10 for reading out data recorded on an optical disc 17 preferably in the form of a radio frequency (RF) signal, an RF processor (RF) 11 for processing the RF signal read out from the optical pickup 10 to output a binary signal and a signal processor 12 for processing the binary signal outputted from the RF processor 11 to reproduce video and audio signals, and outputting the reproduced video and audio signals to a display. A microcomputer (Micom) 14 can control operations including an overall operation of the DVD player. For example, the microcomputer 14 can control operations of the signal processor 12, while controlling the play operation of the DVD player, based on recording information corresponding to a reproduction mode that the user selects and sets from recording information recorded on the optical disc 17 in association with prescribed information such as subtitle languages, audio languages, and audio formats. The DVD player can also include a memory 15 and a servo unit 13. The memory 15 is preferably for storing information and data required for control operations of the microcomputer 14 and for storing reproduction mode codes in order to allow the user to selectively set a desired reproduction mode. The servo unit 13 can control a sled motor adapted to move the optical pickup 10, a spindle motor adapted to rotate the optical disc 17, and perform tracking and focusing control operations for the optical pickup 10.

As shown in FIG. 1, the DVD player preferably allows the user to set a desired reproduction mode, that is, a desired subtitle language, audio language, audio format or the like. Accordingly, the DVD player can play a loaded optical disc based on recording information corresponding to the reproduction mode, for example, that the user selects and sets from recording information recorded on the optical disc in association with subtitle languages, audio languages, and audio formats.

Figure 2:
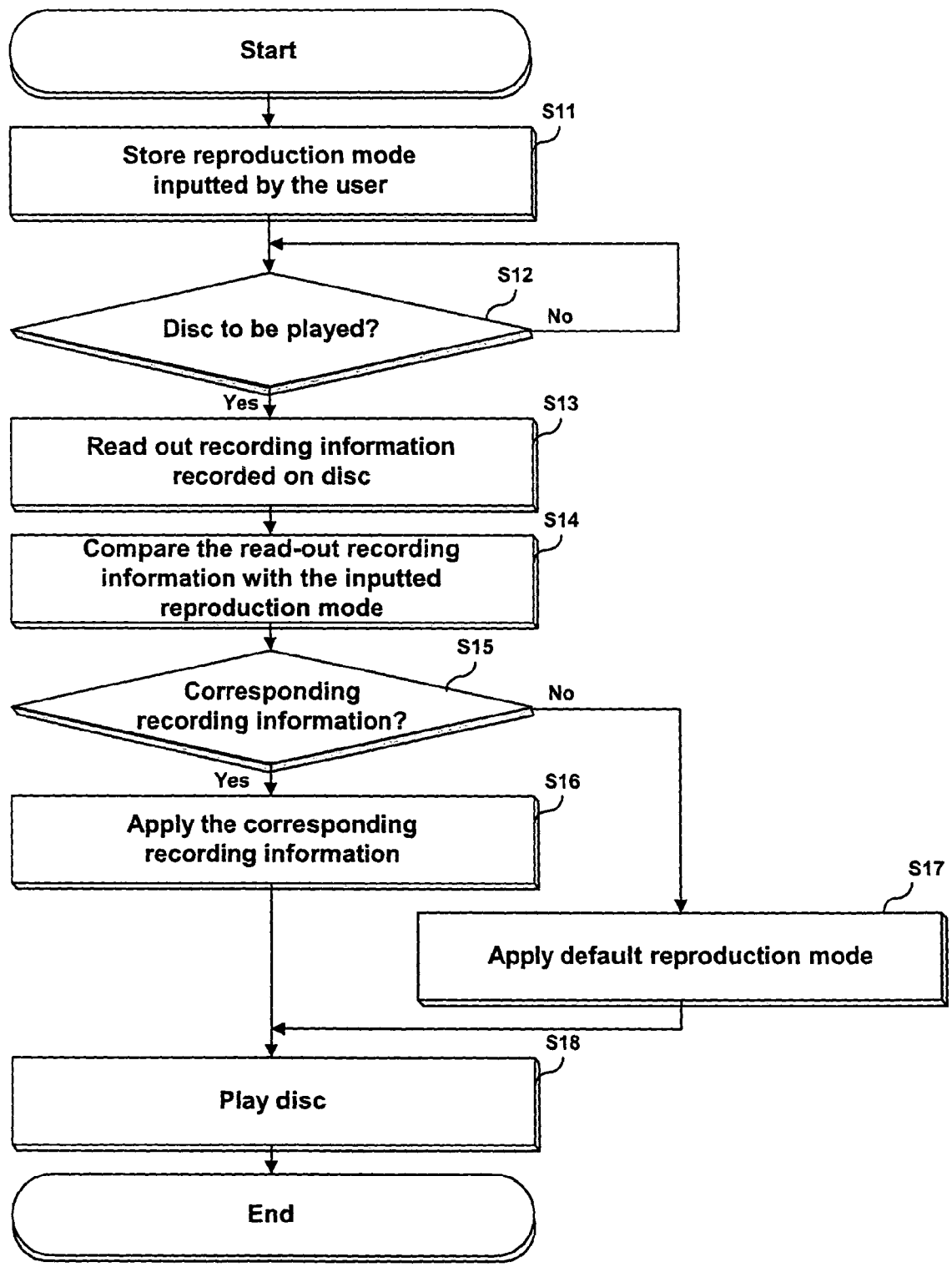
FIG. 2 is a flow chart illustrating a preferred embodiment of a play control method according to the present invention.

FIG. 2 is a flow chart illustrating a preferred embodiment of a play control method according to the present invention. The play control method shown in FIG. 2 can be applied to the DVD player shown in FIG. 1. However, the present invention is not intended to be so limited as preferred embodiments can be applied to other devices such as optical disc players/readers.

In accordance with the preferred embodiment of the play control method of FIG. 2, after a process starts a reproduction mode entered by the user is inputted to the DVD player. The reproduction mode may be, for example, a desired subtitle language, audio language or audio format. The microcomputer 14 can convert the inputted reproduction mode into code data and preferably stores the code data in the memory 15 in order to manage the code data (step S11).

The reproduction mode can be set, for example, by a user through an OSD (on-screen display or the like. However, the present invention is not intended to be so limited. For example, the reproduction mode can be set by an application program, a disc player, remotely, by a user or any appropriate mechanism or method.

Typically on an optical disc, which may be the optical disc 17, recording information in association with recorded data, including multiple subtitle languages, multiple audio languages, multiple audio formats and so forth, is recorded in the manufacture of the optical disc. However, the present invention is not intended to be so limited. For example, the recording information could be recorded or re-recorded after manufacture.

FIG. 3 is a diagram that illustrates an exemplary user menu including reproduction modes set by the user in accordance with the play control method of the FIG. 2, and recording information typically recorded in the manufacture of an optical disc. As shown in FIG. 3, the reproduction modes of the user menu can be set such that the subtitle language is set to Korean (Code No. 0001), the audio language is set to English (Code No. 0002), and the audio format is set to 6 channels, which can strengthen bass.

The recording information recorded on the optical disc in FIG. 3 includes subtitle, audio language, and audio format menus. For example, the subtitle menu can include subtitles recorded in Korean (Code No. 0001), English (Code No. 0002), Spanish (Code No. 0003), French (Code No. 0004), etc. The audio language menu can include audio languages recorded in Korean (Code No. 1001), English (Code No. 1002), Spanish (Code No. 1003), French (Code No. 1004), etc. The audio format menu includes audio formats of a 2-channel system (Code No. 2001), a 6-channel system (Code No. 2002), and a Digital Theater System (DTS) system (Code No. 2003). However, the present invention is not intended to be so limited as the recording information can include other settings.

The code values or numbers of the reproduction modes set by the user are stored and managed. When a disc play command is inputted, it is determined whether a disc has been loaded for playing (step S12). If the disc is determined to be loaded, the microcomputer 14 retrieves the recording information recorded on the optical disc as described above, and reads out the retrieved recording information (step S13).

The microcomputer 14 preferably compares the read-out recording information with the reproduction modes set by the user (step S14), and can determine whether there exists recording information corresponding to the set reproduction modes (step S15).

The comparison and determination procedures associated with the reproduction modes and recording information are preferably carried out for respective reproduction modes to determine whether or not there exists recording information corresponding to each reproduction mode. For the subtitle, for example, it is determined whether or not there exists a code (e.g., Code No. 0001) corresponding to Korean in the recording information read out from the optical disc in association with the subtitle item, because the reproduction mode set by the user in association with the subtitle item is Korean (e.g., Code No. 0001). Following the subtitle determination, preferably comparison and determination procedures are carried out in order to determine whether there exists recording information corresponding to the reproduction mode set by the user in association with each of the audio language and audio format items. However, the present invention is not intended to be so limited.

When it is determined, as the result of the comparison and determination procedures (step S15), that there exists corresponding recording information for any one of the set reproduction modes, the corresponding recording information is preferably selected (step S16). Based on the selected recording information, the play operation of the optical disc can be carried out (step S18). As shown in FIG. 3, for example, the subtitle language is reproduced in Korean, the audio language is reproduced in English, and the audio format is reproduced in a 6-channel system.

On the other hand, when it is determined, as the result of the comparison and determination procedures (step S15), that there is no corresponding recording information for any one of the set reproduction modes, the recording information corresponding to the reproduction mode set as a default in the optical disc can be selected (step S17). Based on the selected recording information (e.g., default), the play operation of the optical disc can be carried out (step S18).

Typically, the recording information recorded on an optical disc includes one or more reproduction information, which is recorded in the manufacture of the optical disc, in association with each of the menu items such as the subtitle item, the audio language item and the audio format item. Accordingly, one or more reproduction modes may be retrieved for each menu item, as shown in FIG. 3. Generally, the higher-order one of the retrieved reproduction modes is determined as a default. Based on the default reproduction mode, the play operation of the optical disc can also be carried out.

Further, for some menu items there can exist the recording information corresponding to the reproduction modes set by the user, but at the same time, for the other menu items, there is no recording information corresponding to the reproduction modes set by the user. In this case, for the former items, the play operation of the optical disc is preferably carried out based on the reproduction modes set by the user, but for the latter items, the play operation of the optical disc is preferably carried out based on the default recording information.

In addition, if an invalid or unsupported reproduction information is set by an application program, remotely or a user, the play operation can preferably use the default recording in formation. For example, where the subtitle item is set to Korean, the audio language item to Korean, and the audio format item to a 6-channel system, if an optical disc is inserted in which Korean mode exists in the subtitle item, and Korean mode exists in the audio language item, but 6-channel system mode doesn't exist in the audio formats, the play operation of the optical disc can be carried out based on the set reproduction modes for the subtitle and audio language items, and a default for the audio format item.

Figure 4:
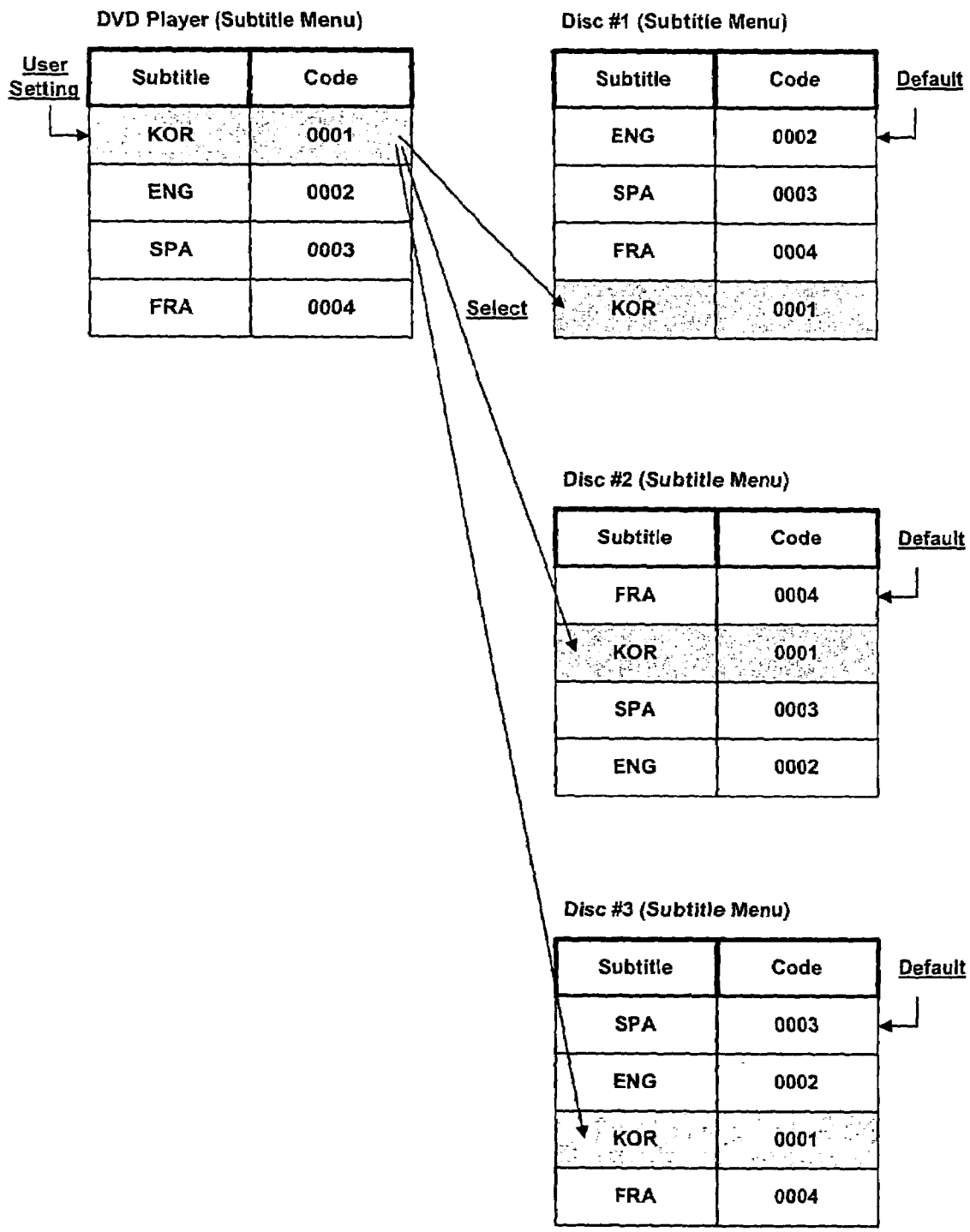
FIG. 4 is a diagram illustrating a selection of respective subtitles of different DVDs corresponding to subtitles of an exemplary user menu stored in the DVD player in accordance with preferred embodiments of the present invention.

In accordance with a preferred embodiment of a play control method according to the present invention, subtitle language codes can be displayed (and stored) in the DVD player in the form of a table (e.g., an on-screen display to allow the user to selectively designate a desired subtitle language from the table, for example, as shown in FIG. 4. Preferably, the codes shown in FIG. 4 would not be displayed to a user. When the user selectively designates a desired subtitle language, for example Korean (KOR), a code No. 0001 corresponding to the Korean language is automatically designated as a subtitle language for all optical discs to be loaded following the designation of the subtitle language. Accordingly, the subtitle language is automatically reproduced in Korean for a current disc, if loaded, and subsequent discs until changed by the user. However, the present invention is not intended to be so limited.

That is, even in the case of a first optical disc (Disc #1) as shown in FIG. 4 in which English (ENG) is set as a default subtitle language, the DVD player reproduces, from the first optical disc, a Korean subtitle language corresponding to the code No. 0001 (Korean subtitle language) designated by the user.

In the case of a second optical disc (Disc #2) as shown in FIG. 4 where French (FRA) is set as a default subtitle language, the DVD player reproduces, from the second optical disc, a Korean subtitle language corresponding to the code No. 0001 (Korean subtitle language) designated by the user. Accordingly, the DVD player plays optical discs in a subtitle language selected by the user, irrespective of the default subtitle language of each optical disc. Thus, it is possible to automatically reproduce a particular subtitle language designated by the user even when optical discs of different types are loaded. In addition, the designated subtitle language can be produced even when an optical disc is re-loaded.

Similar to the subtitle language item, it is possible to automatically reproduce a particular audio language and a particular audio format according to preferred embodiments by designating the particular audio language and audio format even when optical discs of different types are loaded in the DVD player. Similarly, in a case where there exists a subtitle language corresponding to the set reproduction mode in the subtitle menu, but there is no audio language (or an invalid audio language) corresponding to the set reproduction mode in the audio language menu, reproduction of subtitle and audio languages is carried out by reproducing the subtitle language corresponding to the reproduction mode set by the user while preferably reproducing the default audio language corresponding to the highest-order audio language recorded in the associated optical disc.

As described above, preferred embodiments according to the present invention have various advantages. Preferred embodiments can provide a play control method and a optical disc (e.g., DVD) player that is capable of carrying out play operations of optical discs of different types in the DVD player in accordance with selected reproduction modes. The user can select and set from the selected reproduction modes that can include subtitle languages, audio languages and audio formats, for example, recorded on each optical disc. Accordingly, preferred embodiments of the present invention make it unnecessary to set desired reproduction modes for each optical disc.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A play control method in a recording medium player comprising:
   setting and storing a desired reproduction mode of a user menu in the recording medium player;
   reading out recording information and reproduction modes from a disc;
   comparing the stored reproduction mode to the recording information and reproduction modes read out from the disc;
   reading out and reproducing information recorded on the disc in accordance with the stored reproduction mode when the stored reproduction mode corresponds to the recording information and reproduction modes read out from the disc; and
   reading out and reproducing the information recorded on the disc in accordance with a default reproduction mode when the stored reproduction mode does not correspond to the recording information and reproduction modes read out from the disc.

2. The play control method according to claim 1, wherein the user menu comprises at least one of reproduction modes respectively associated with a subtitle language, an audio language, and an audio format.

3. The play control method according to claim 1, wherein the storing comprises storing a predetermined code value corresponding to the set reproduction mode.

4. The play control method according to claim 1, wherein the information recorded on the disc comprises corresponding recording information for at least one of reproduction modes respectively associated with at least one subtitle language, at least one audio language, and at least one audio format.

5. The play control method according to claim 4, wherein the recording information recorded on the disc has a value corresponding to a predetermined code value.

6. The method of claim 1, wherein said setting the reproduction mode includes a user-selected reproduction mode, and wherein the user selection is performed through a remote device operation or a data entry device of the recording medium player.

7. The method of claim 1, wherein the set reproduction mode is retrievably stored in the recording medium player.

8. The method of claim 1, wherein the reading out and reproducing information comprises:
   loading a first optical disc into the recording medium player,
   playing corresponding information recorded on the first disc in accordance with the stored reproduction mode,
   loading a second optical disc into the recording medium player, and
   playing corresponding information recorded on the second disc in accordance with the stored reproduction mode.

9. A play control method in a recording medium player comprising;
   setting and storing a user prescribed reproduction mode in the recording medium player;
   reading a disc reproduction mode from a disc in the recording medium player;
   comparing the stored user prescribed reproduction mode to the disc reproduction mode read out from the disc;
   playing information recorded on a plurality of subsequently loaded discs in accordance with a current reproduction mode, wherein the current reproduction mode comprises the stored user prescribed reproduction mode when the user prescribed reproduction mode corresponds to the disc reproduction mode read out from the disc, and the current reproduction mode comprises the disc reproduction mode when the user prescribed reproduction mode does not correspond to the disc reproduction mode read out from the disc.

10. The method of claim 9, wherein the current reproduction mode includes subtitle, audio language or audio format.

11. The method of claim 9, wherein said setting a user prescribed reproduction mode includes a user-selected reproduction mode, and wherein the user selection is performed through a remote device operation or a data entry device of the recording medium player.

12. The method of claim 9, wherein the user prescribed reproduction mode is retrievably stored in the recording medium player.

13. The method of claim 9, wherein the playing comprises:
   loading a first optical disc into the recording medium player,
   playing corresponding information recorded on the first disc in accordance with the current reproduction mode,
   loading a second optical disc into the recording medium player, and
   playing corresponding information recorded on the second disc in accordance with the current reproduction mode.

14. The method of claim 13, wherein the first and second discs are a same disc.

15. A recording medium player, comprising:
   means for setting and storing a reproduction mode in the recording medium player;
   means for reading a disc reproduction mode from a disc; and
   means for reproducing information stored on the disc in accordance with the user selected reproduction mode when the user selected reproduction mode corresponds to the disc reproduction mode read out from the disc, and for reproducing information stored on the disc in accordance with the disc reproduction mode when the user selected reproduction mode does not correspond to the disc reproduction mode read out from the disc.

16. The recording medium player of claim 15, wherein the recording medium player comprises an optical disc player.

17. The method of claim 9, wherein the recording medium player comprises a DVD player.

18. The play control method of claim 1, wherein the recording medium player comprises an optical disc player.

* * * * *